United States Patent [19]
Braillon

[11] 3,775,717
[45] Nov. 27, 1973

[54] PERMANENT-MAGNET HOLDER FOR FERROMAGNETIC WORKPIECES

[76] Inventor: Philibert Maurice Albert Braillon, 2, rue d'Alexandry, Chambery, France

[22] Filed: Apr. 27, 1972

[21] Appl. No.: 248,121

[52] U.S. Cl. .............................. 335/295, 335/306
[51] Int. Cl. ............................................ H01f 7/04
[58] Field of Search .................. 335/285, 286, 295, 335/306

[56] References Cited
FOREIGN PATENTS OR APPLICATIONS
939,584  10/1963  Great Britain ..................... 335/295
868,491  5/1961  Great Britain ..................... 335/295

Primary Examiner—George Harris
Attorney—Karl F. Ross

[57] ABSTRACT

A workpiece holder, such as a chuck of a machine tool, comprises a magnetically permeable base plate, a face plate parallel thereto with alternating permeable and nonpermeable strip zones, and a working core flush with a surrounding frame sandwiched between the two plates. The face plate is divided into a multiplicity of alternately permeable and nonpermeable transverse strip zones. The core and the frame consist each of a nonmagnetic body traversed by throughgoing elements alternately constituted by bar magnets and by pole pieces, these elements forming an orthogonal array of rows and columns with each column paralleling a respective permeable strip zone of the face plate. By shifting the core — or segments thereof — relatively to the frame, the magnets of adjacent rows can be either aligned with or offset from one another. In the first instance the columns of aligned magnets are separated from the columns of aligned pole pieces by barriers formed by the nonpermeable strip zones of the face plate so that their flux must follow a path which is closed through a ferromagnetic workpiece overlying that plate; in the second instance the lines of force from the magnets of each column pass through a pole piece of the same column via a confronting permeable strip zone of the face plate so that the workpiece is released.

6 Claims, 9 Drawing Figures

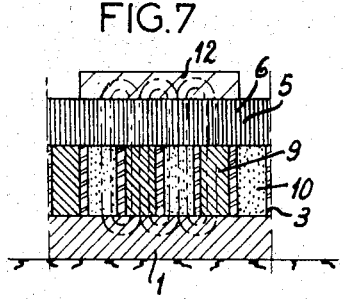
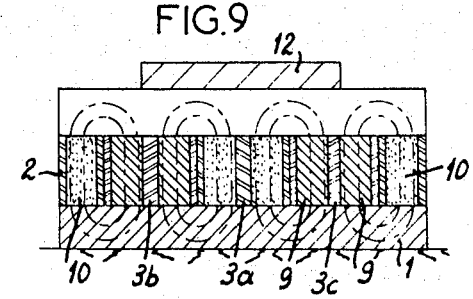
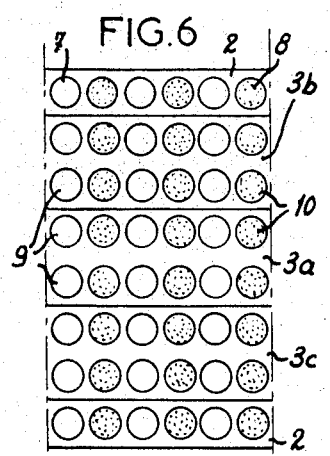
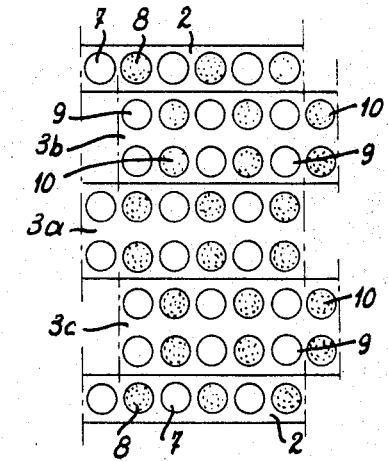

PERMANENT-MAGNET HOLDER FOR FERROMAGNETIC WORKPIECES

BACKGROUND OF THE INVENTION

The present invention relates in general to machines and apparatus utilizing permanent magnets for holding ferromagnetic workpieces and the like; it is concerned more particularly with work tables and chucks associated with various machine tools. To simplify the disclosure, this invention will be described hereinafter with specific reference to its application to magnetic chucks, but this reference should not be taken in a limiting sense as far as the bearing of the invention is concerned.

A magnetic work table or chuck comprises essentially a mild-steel base plate, a power magnetic core consisting of juxtaposed magnets and pole pieces, a magnetic frame in which this core is adapted to slide, and a face plate consisting of juxtaposed pole pieces and nonmagnetic spacers.

The manufacture of these tables or chucks is attended by various difficulties, inter alia :

assembling the magnets and pole pieces for constituting the core requires the use of various means such as tie-rods or of molded or mechanically welded grids; in any case, and irrespective of the means employed the core always is an expensive element;

in order to obtain cores and therefore tables of various dimensions, the manufacturer must have a wide range of magnet sizes and pole pieces at his disposal;

the frame in which the core is slidably mounted consists of magnetic material; therefore, the magnetic attraction is reduced along the entire periphery of the fare plate. Under these conditions, the effective surface area exerting a satisfactory pull is smaller than the over-all or actual surface area of the chuck.

SUMMARY OF THE INVENTION

It is the essential object of the present invention to avoid these inconveniences. To this end, the workpiece holder according to our invention encompasses the following features:

Its frame or like fixed structure consists of nonmagnetic material and has at least in its two major sides a plurality of recesses perpendicular to the main surface of the chuck for receiving a series of alternate magnets and pole pieces;

The movable core consists of at least one plate of nonmagnetic material in which two series of recesses corresponding to the frame recesses are formed to receive another series of alternate magnets and pole pieces; and The fixed face plate consists of stacked pole pieces and nonmagnetic spacers disposed transversely, the core being adapted to be set in two positions, i.e., a first or holding position in which the magnets of the frame and core are in mutual alignment in the transverse direction, so that the magnetic field is directed longitudinally and closed through the workpieces or other members carried by the chuck, and another position in which the frame magnets are not aligned with the core magnets so that the field is directed transversely and closed directly through the pole pieces of the polar plate.

The primary advantage resulting from our invention is that the manufacturers of such holding chucks or work tables can make cores and therefore structures in a relatively wide range of sizes by using only one type, one quality or grade, and substantially one size of magnet.

Another important advantage results from the fact that the working core is easy to manufacture since it is only necessary to have it made from a block of nonmagnetic material such as aluminum or light alloys, bronze, brass, etc. or even synthetic materials, in which preferably cylindrical holes are formed for receiving the magnets and pole pieces of corresponding shape.

A still further advantageous feature of this invention is the substantial increment in the efficiency of the workpiece holder whose magnetic attraction is distributed uniformly throughout the surface area thereof, including its peripheral or marginal area.

The features of this invention are of course applicable to chucks and work tables of any dimensions. However, it should be emphasised that a core comprising a single plate can be used only with relatively narrow chucks. In the case of wider chucks, we prefer to provide a core construction with an odd number of plates each comprising two series of recesses for the magnets and pole pieces, these plates being alternately fixed and movable with respect to their common frame.

Thus, for instance, in the case of a chuck having a three-plate core, the intermediate plate is fixed and the lateral plates located between this intermediate core and the longitudinal edges of the frame are movable.

Besides, whatever the number of these movable elements, the core movement necessary for positioning the chuck in its operative or inoperative condition is controlled in any suitable manner, e.g. by cams in a manner known per se.

A clearer understanding of this invention and of the specific advantages and features thereof will appear from the following description given by way of example with reference to the accompanying drawing, illustrating diagrammatically two typical embodiment of our improved magnetic chuck.

Figure 1:
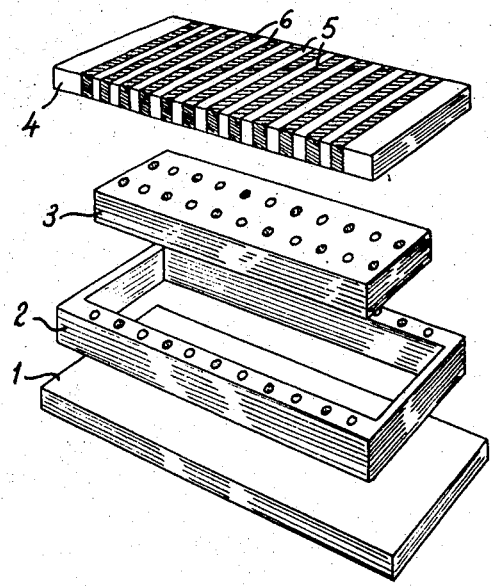
FIG. 1 is an exploded perspective view showing the various component elements of a relatively narrow magnetic chuck or work table.
Figure 3:
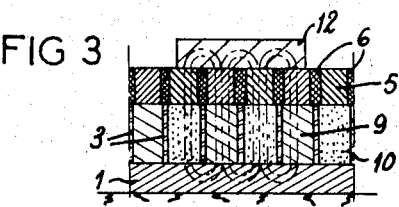
FIG. 3 is a longitudinal section taken along the line 3—3 of FIG. 2, with the polar plate fitted to the device.
Figure 5:
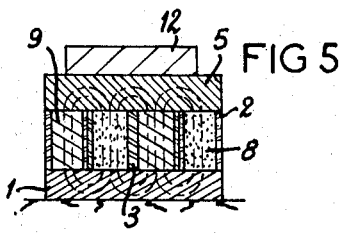
Figure 4:
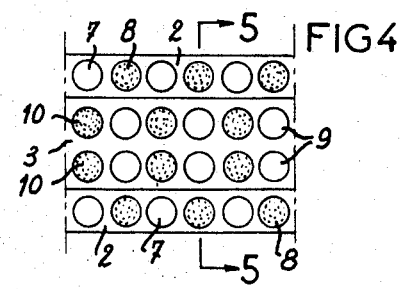
FIG. 4 is a plan view from above of the chuck in its inoperative position, the polar plate being removed therefrom.

FIG. 5 is a cross-sectional view taken along the line 5—5 of FIG. 4, with the polar plate fitted to the device, and FIGS. 6, 7 and 8, 9 are views corresponding to FIGS. 2, 3 and 4, 5, respectively in the case of a relatively wide chuck.

DESCRIPTION OF THE PREFERRED EMBODIMENT

As already known per se, the magnetic chuck or work table according to this invention comprises essentially the superposition and imbrication of the following elements : a magnetically permeable base plate 1, a frame 2, a working core 3, and a face plate 4 divided into permeable and nonpermeable strip zones.

Among these elements, two are conventional : they are the base plate 1 consisting of mild steel, and the face plate 4 which, consists of a stack of pole pieces 5 and nonmagnetic spacers 6. It may be pointed out that the pole spacing of plate 4 may be varied as a function of the thickness of its component elements. Thus, in the case of the chuck structure illustrated in FIGS. 2 to 5, the pole spacing is large; in the case of the work table shown in FIGS. 6 to 9 this pitch is relatively small since the thickness of the steel elements constituting the pole pieces is about 0.7 mm while the spacers 6 comprise brass strips having a thickness on the order of 0.5 mm. Of course, close spacing is advantageous in that it improves the chuck performances since it permits the magnetic holding of small, medium- and large-sizes pieces. However, it will be seen that any pole spacing may be adapted at will to a narrow-core chuck, as shown in FIGS. 2 to 5, or to a wide-core chuck, as shown in FIGS. 6 to 9.

In any case, the principal feature of this invention is the relative arrangement of frame 2 and of the working core 3 associated therewith.

The frame 2 comprises, as shown in the drawing, a hollow rectangular structure of nonmagnetic material in which recesses, preferably of cylindrical configuration are formed. These recesses are alternately occupied by pole pieces 7 and bar magnets 8.

The working core 3 also consists of a block of nonmagnetic material in which other cylindrical recesses are formed and disposed in two longitudinal rows; these latter recesses are alternatively occupied by pole piece 9 and bar magnets 10.

Figure 2:
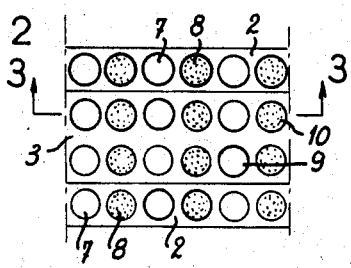
FIG. 2 is a plane view from above showing the device in its operative position, the polar plate being removed.

On the other hand, as known per se, the core 3 is movably fitted in frame 2 so that it can be set in either of two positions shown in FIGS. 2 and 4, respectively. In the position illustrated in FIG. 2 the pole pieces 7, 9 are aligned in the transverse direction of the rectangular frame 2 and the magnets 8, 10 similarly aligned. This is the operative position of the chuck, wherein one or more members designated by the reference numeral 12 in FIG. 3 are attracted and therefore retained on the face plate 4 of the chuck. In this position, as shown in FIG. 3, the lines of force of the magnetic field (which is perpendicular to the chuck surface) cannot close their loops through the face plate 4, owing to the presence of the transverse barriers consisting of the magnetic gaps 6, they close these loops in longitudinal planes through the workpiece or other member 12 to be held by the device.

When the core 3 is moved to its other position, i.e., the position illustrated in FIGS. 4 and 5, the chuck is inoperative for the magnets 10 of core 3 are now offset from the magnets 8 of frame 2. Under these conditions, the lines of force of frame magnets 8 close their loops in transverse planes through the laterally adjoining pole pieces 9 of core 3 and the overlying permeable strips 5 of plate 4, as illustrated in FIG. 5, while the flux paths of core magnets 10 are similarly completed by way of the same strips and the adjoining pole pieces 7 of frame 2.

The workpiece holder illustrated in FIGS. 6 to 9 differs from the one illustrated in FIGS. 2 to 5 in that its working core comprises three bars or plates 3a, 3b and 3c, in lieu of a single block, each of these three bars comprising two rows of holes occupied alternately by pole pieces 9 and magnets 10. The central bar 3a of the core is stationary while the lateral bars 3b and 3c are movable simultaneously.

Thus, the core can be set either in the position shown in FIGS. 6 and 7 or in the position shown in FIGS. 8 and 9.

In the first case (FIGS. 6 and 7) the chuck is in its operative position since all the magnets 8 and 10, are mutually aligned, while in the case of the position illustrated in FIGS. 8 and 9 the core magnets 10 of bars 3b and 3c are offset from the magnets 8 of frame 2 and also from magnets 10 of bar 3a. This is the inoperative position in which the lines of force are looped through the pole pieces 5 of plate 4.

In either arrangement, i.e. the one shown in FIGS. 2 to 5 and the one shown in FIGS. 6 to 9, the magnets and pole pieces incorporated in the frame 2 and core 3 are identical so that the chuck can be manufactured under mass-production conditions; large-sized chucks can be produced by using a single type of magnets and pole pieces. Moreover, thanks to the presence of magnets 8 in frame 2, the magnetic pull is uniform throughout the surface area of the chuck.

Although the present invention has been described with specific reference to certain embodiments thereof, it will readily occur to those conversant with the art that the same is susceptible of various modifications and variations without departing from the spirit and scope of the invention as set forth in the appended claims.

What is claimed as new is:

1. A holder for ferromagnetic workpieces, comprising:

a magnetically permeable base plate;
a face plate paralleling said base plate, said face plate being divided into a series of alternately permeable and nonpermeable parallel strip zones; and
an insert sandwiched between said plates, said insert including a core and a surrounding frame flush with each other, said insert being provided with an orthogonal array of through-going elements extending from said face plate to said base plate, said elements consisting alternately of bar magnets and of pole pieces forming columns respectively confronting said permeable strip zones and rows perpendicular to said columns, two of said rows being disposed along opposite edges of said frame, at least one other pair of said rows being disposed on said core;
said frame and at least part of said core being relatively displaceable between an operative position in which said magnets are aligned in certain of said columns and said pole pieces are aligned in other of said columns, whereby a closed flux path for said magnets can be closed only through a workpiece on said face plate bridging adjacent permeable strip zones thereof, and an inoperative position in which each magnet is juxtaposed with a pole piece within the same column, whereby the flux path is closed through a confronting permeable strip zone of said face plate.

2. A holder as defined in claim 1 wherein said elements are in the shape of cylinders with axes perpendicular to the major faces of said plates.

3. A holder as defined in claim 1 wherein part of said frame is rectangular with major sides extending in the direction of said rows.

4. A holder as defined in claim 3 wherein at least part of said core is longitudinally shiftable in said frame by the width of one column to establish said operative and inoperative positions.

5. A holder as defined in claim 1 wherein said core is divided into an odd number of segments each carrying a pair of said rows, alternate segments being jointly shiftable with reference to said frame.

6. A holder as defined in claim 5 wherein the number of said segments is three, the middle segment being fixed with reference to said frame.

* * * * *

UNITED STATES PATENT OFFICE
CERTIFICATE OF CORRECTION

Patent No. 3,775,717                    Dated 27 November 1973

Inventor(s) Philibert Maurice Albert BRAILLON

It is certified that error appears in the above-identified patent and that said Letters Patent are hereby corrected as shown below:

In the heading, after line [21] insert:

-- Foreign Application Priority Data

13 May 1971    France ............ 71 18 322 --

Signed and sealed this 16th day of July 1974.

(SEAL)
Attest:

McCOY M. GIBSON, JR.          C. MARSHALL DANN
Attesting Officer             Commissioner of Patents